(12) United States Patent
Seo et al.

(10) Patent No.: US 9,807,710 B2
(45) Date of Patent: Oct. 31, 2017

(54) METHOD FOR CONTROLLING TRANSMISSION POWER OF DISCOVERY SIGNAL FOR DEVICE-TO-DEVICE COMMUNICATION IN WIRELESS COMMUNICATION SYSTEM AND DEVICE FOR SAME

(71) Applicant: LG ELECTRONICS INC., Seoul (KR)

(72) Inventors: Hanbyul Seo, Seoul (KR); Hakseong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 14/762,165

(22) PCT Filed: Jan. 22, 2014

(86) PCT No.: PCT/KR2014/000616
§ 371 (c)(1),
(2) Date: Jul. 20, 2015

(87) PCT Pub. No.: WO2014/116020
PCT Pub. Date: Jul. 31, 2014

(65) Prior Publication Data
US 2015/0327189 A1     Nov. 12, 2015

Related U.S. Application Data

(60) Provisional application No. 61/756,447, filed on Jan. 24, 2013.

(51) Int. Cl.
*H04W 52/38*     (2009.01)
*H04W 4/00*     (2009.01)
(Continued)

(52) U.S. Cl.
CPC ........ *H04W 52/383* (2013.01); *H04W 4/005* (2013.01); *H04W 8/005* (2013.01);
(Continued)

(58) Field of Classification Search
None
See application file for complete search history.

(56) References Cited

U.S. PATENT DOCUMENTS

| 2009/0011770 A1 | 1/2009 | Jung et al. |
| 2010/0110999 A1 | 5/2010 | Li et al. |

(Continued)

FOREIGN PATENT DOCUMENTS

| JP | 2001-044932 A | 2/2001 |
| JP | 2013-509659 A | 3/2013 |

(Continued)

*Primary Examiner* — Hassan Kizou
*Assistant Examiner* — Roberta A Shand
(74) *Attorney, Agent, or Firm* — Dentons US LLP

(57) ABSTRACT

A method by which a terminal transmits a discovery signal for device-to-device communication in a wireless communication system is disclosed in the present application. Particularly, the method comprises the steps of: receiving one or more downlink signals; determining transmission power for transmitting the discovery signal on the basis of reference reception power of the one or more downlink signals; and transmitting the discovery signal on the basis of the determined transmission power, wherein the transmission power decreases as the reference reception power increases.

6 Claims, 11 Drawing Sheets

(51) Int. Cl.
  *H04W 8/00* (2009.01)
  *H04W 52/24* (2009.01)
  *H04W 52/36* (2009.01)

(52) U.S. Cl.
  CPC ........ *H04W 52/242* (2013.01); *H04W 52/367* (2013.01); *Y02B 60/50* (2013.01)

(56) References Cited

U.S. PATENT DOCUMENTS

| | | | |
|---|---|---|---|
| 2010/0120370 A1* | 5/2010 | Ishii | H04B 7/022 455/67.11 |
| 2011/0013617 A1* | 1/2011 | Ito | H04L 5/0007 370/344 |
| 2012/0238302 A1* | 9/2012 | Pedersen | H04W 52/242 455/501 |
| 2012/0269072 A1 | 10/2012 | Wu et al. | |
| 2012/0311101 A1 | 12/2012 | Chao | |
| 2013/0017856 A1 | 1/2013 | Murias | |
| 2013/0310103 A1 | 11/2013 | Madan et al. | |
| 2013/0322277 A1* | 12/2013 | Vanganuru | H04W 24/08 370/252 |
| 2013/0324182 A1* | 12/2013 | Deng | H04W 52/281 455/522 |
| 2014/0003262 A1* | 1/2014 | He | H04W 28/08 370/252 |
| 2014/0010099 A1* | 1/2014 | Chiu | H04W 72/085 370/252 |
| 2014/0094213 A1* | 4/2014 | Khoshnevis | H04W 52/383 455/522 |

FOREIGN PATENT DOCUMENTS

| | | |
|---|---|---|
| JP | 2013-522965 A | 6/2013 |
| KR | 1020120088791 | 8/2012 |
| KR | 1020130004497 | 1/2013 |
| WO | 2011/011637 A2 | 1/2011 |
| WO | 2013/002206 A1 | 1/2013 |

* cited by examiner (a) control plane protocol stack (b) user plane protocol stack

METHOD FOR CONTROLLING TRANSMISSION POWER OF DISCOVERY SIGNAL FOR DEVICE-TO-DEVICE COMMUNICATION IN WIRELESS COMMUNICATION SYSTEM AND DEVICE FOR SAME

This application is a National Stage Application of International Application No. PCT/KR2014/000616, filed Jan. 22, 2014, and claims the benefit of U.S. Provisional Application No. 61/756,447, filed Jan. 24, 2013, all of which are hereby incorporated by reference in their entirety for all purposes as if fully set forth herein.

TECHNICAL FIELD

The present invention relates to a wireless communication system and, more particularly, to a method and apparatus for controlling transmit power of a discovery signal for device-to-device communication in a wireless communication system.

BACKGROUND ART

As a representative example of a wireless communication system of the present invention, 3rd Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Evolved Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention devised to solve the problem lies in a method and apparatus for controlling transmit power of a discovery signal for device-to-device communication in a wireless communication system.

Technical Solution

The object of the present invention can be achieved by providing a method of transmitting a discovery signal for device-to-device (D2D) communication at a user equipment (UE) in a wireless communication system including receiving one or more downlink signals, determining transmit power for transmitting the discovery signal according to reference receive power of the one or more downlink signals, and transmitting the discovery signal according to the determined transmit power, wherein the transmit power decreases as the reference receive power increases.

The transmit power may decrease as the reference receive power increases when the reference receive power is less than a first value of receive power and increase as the reference receive power increases when the reference receive power is equal to or greater than the first value of receive power. When the reference receive power is less than a second value of receive power less than the first value of receive power, the transmit power may be maintained at a predetermined value. The transmit power may be restricted to pre-set transmit power or less when the reference receive power is equal to or greater than the first value of receive power.

When the determined transmit power is less than minimum transmit power, the transmit power may be re-set to the minimum transmit power.

The determining the transmit power may include determining one of a mean value, a minimum value and a maximum value of the receive power of the one or more downlink signals as the reference receive power.

In another aspect of the present invention, provided herein is a user equipment (UE) apparatus for performing device-to-device (D2D) communication in a wireless communication system including a wireless communication module configured to transmit and receive a signal to and from a base station or a counterpart UE apparatus of D2D communication, and a processor configured to process the signal, wherein the processor is configured to control the wireless communication module to determine transmit power for transmitting a discovery signal according to reference receive power of one or more downlink signals and to transmit the discovery signal according to the determined transmit power, and wherein the processor decreases the transmit power as the reference receive power increases.

The processor may decrease the transmit power as the reference receive power increases when the reference receive power is less than a first value of receive power and increase the transmit power as the reference receive power increases when the reference receive power is equal to or greater than the first value of receive power. The processor may maintain the transmit power at a predetermined value when the reference receive power is less than a second value of receive power less than the first value of receive power. The processor may restrict the transmit power to pre-set transmit power or less when the reference receive power is equal to or greater than the first value of receive power.

The processor may re-set transmit power to minimum transmit power when the determined transmit power is less than the minimum transmit power. The processor may determine one of a mean value, a minimum value and a maximum value of the receive power of the one or more downlink signals as the reference receive power.

Advantageous Effects

According to embodiments of the present invention, it is possible to more efficiently transmit a discovery signal for device-to-device communication in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a 3rd Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary. In addition, although the embodiment of the present invention will be disclosed on the basis of an FDD scheme as an example, the scope or spirit of the embodiment of the present invention is not limited thereto and can also be applied to H-FDD and TDD schemes as necessary.

Figure 1:
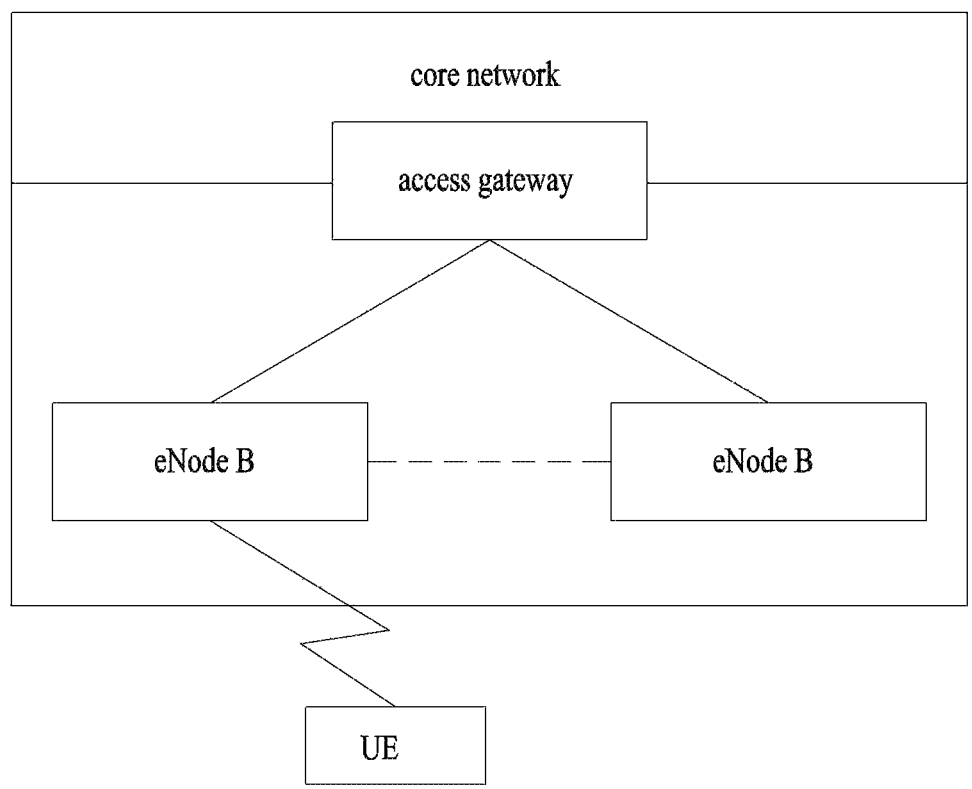
FIG. 1 is a conceptual diagram illustrating an Evolved Universal Mobile Telecommunications System (E-UMTS) network structure as an exemplary mobile communication system.
Figure 2:
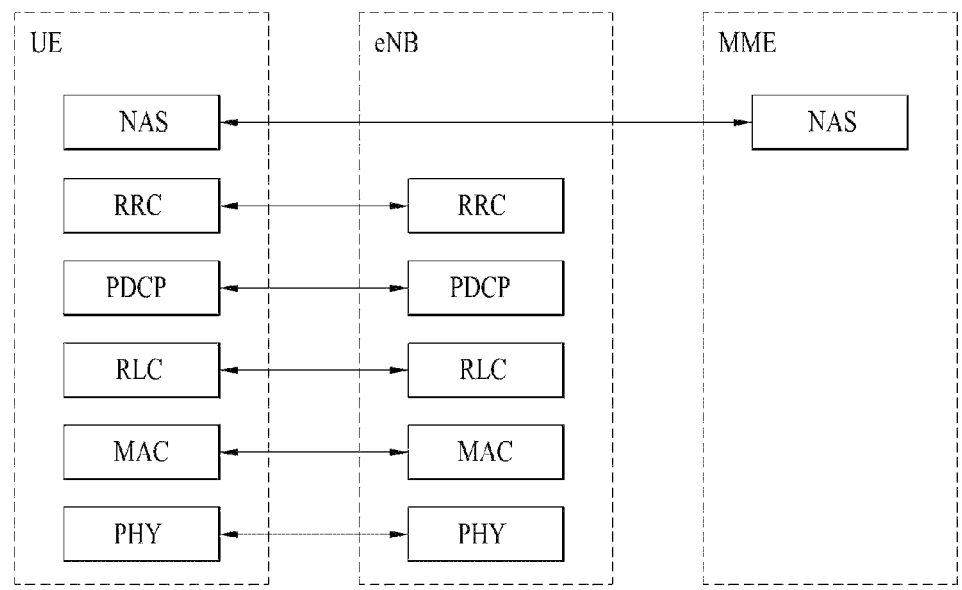
FIG. 2 illustrates a control plane and a user plane (U-Plane) of a radio interface protocol between a User Equipment (UE) and an E-UTRAN according to the 3GPP wireless access network standard.
Figure 2:
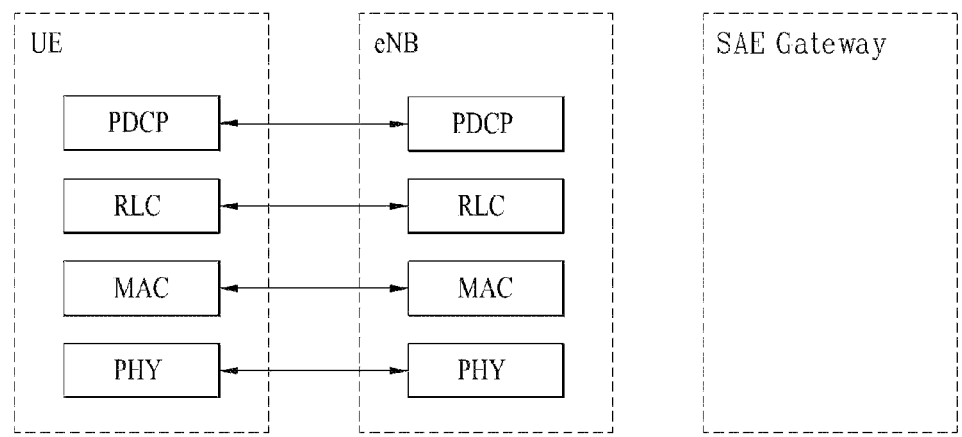

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, reconfiguration and release of Radio Bearers (RBs). The radio bearer (RB) is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB (eNode-B) is set to use a bandwidth such as 1.4, 3, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
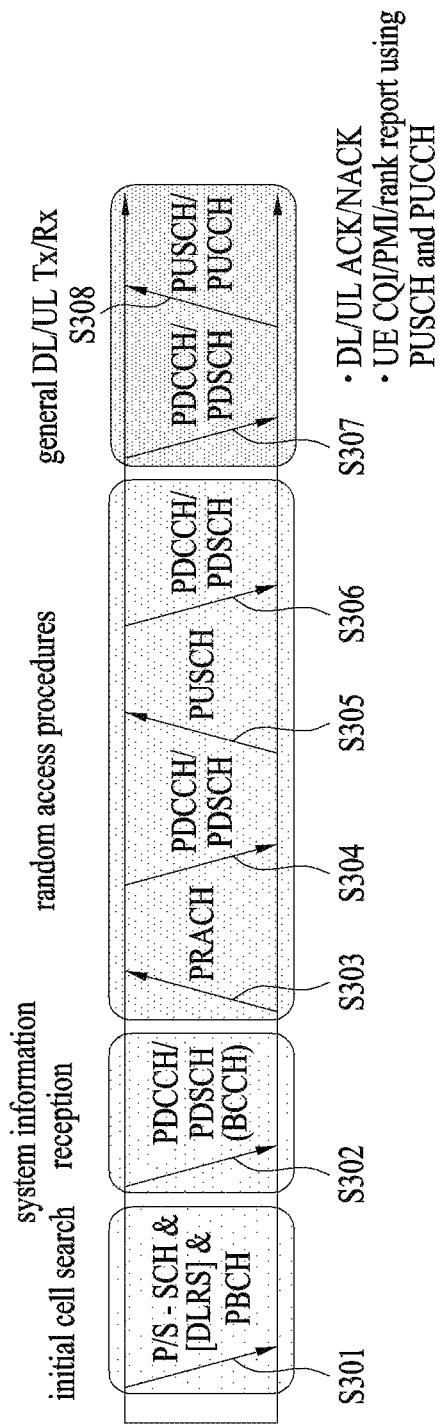
FIG. 3 is a conceptual diagram illustrating physical channels used in a 3GPP LTE system as an exemplary wireless communication system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps (S303~S306) and receive a response message for the preamble on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
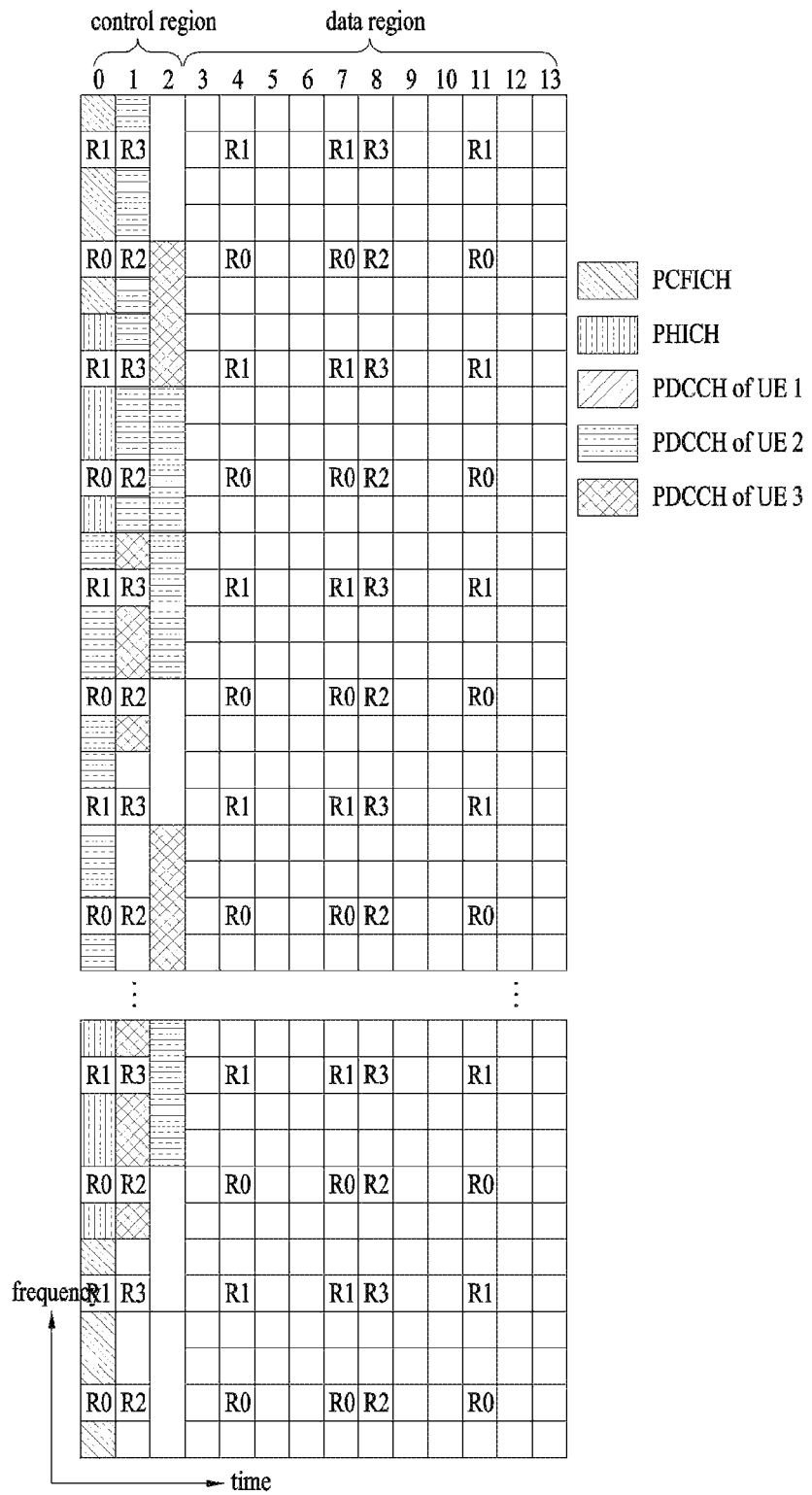
FIG. 4 is a conceptual diagram illustrating a downlink radio frame for use in an LTE system.

FIG. 4 shows a control channel contained in a control region of one subframe in a downlink radio frame according to one embodiment of the present invention.

Referring to FIG. 4, one subframe includes 14 OFDM symbols. First to third ones of the 14 OFDM symbols may be used as a control region, and the remaining OFDM symbols (i.e., 11 to 13 OFDM symbols) may be used as a data region. In FIG. 4, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid-Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)-modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

REG which is the basic resource unit of a DL control channel is composed of four neighbor REs in a state of excluding the RS. The PCFICH and the PHICH include four REGs and three REGs, respectively. The PDCCH is composed of CCE units and one CCE includes 9 REGs.

Figure 5:
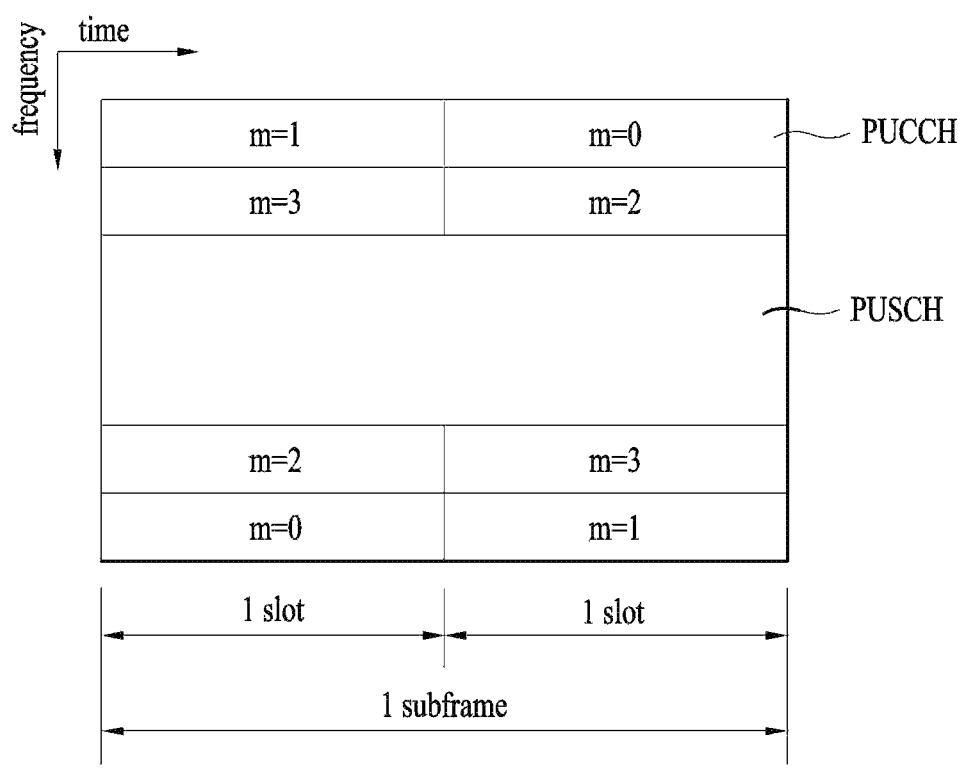
FIG. 5 is a conceptual diagram illustrating an uplink radio frame for use in an LTE system.

FIG. 5 illustrates a structure of a UL subframe in LTE.

Referring to FIG. 5, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH.

Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}[\text{dBm}] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\left\{ \begin{array}{l} 10\log_{10}\left((\hat{P}_{CMAX,c}(i) - \hat{P}_{PUCCH}(i)\right), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}[\text{dBm}] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$ $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_PRE}$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c$ (j) is a pathloss compensation factor and a cell-specific parameter provided by the higher layer and transmitted as 3 bits by the base station. $\alpha\epsilon\{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 1.

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 2 or one of SET2 of Table 3, determined by a TPC-index parameter provided by the higher layer.

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{c}P_{CMAX,c}(i),\\ P_{O\_PUCCH} + PL_c + h(n_{CQI}, n_{HARQ}, n_{SR}) + \Delta_{F\_PUCCH}(F) + \Delta_{TxD}(F') + g(i)\end{array}\right\}[dBm] \quad [\text{Equation 3}]$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 4 and 5 show $\delta_{PUCCH}$ indicated by a TPC command in DCI formats. Particularly, Table 4 shows $\delta_{PUCCH}$ indicated in DCI formats other than DCI format 3A and Table 5 shows $\delta_{PUCCH}$ indicated in DCI format 3A.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC Command Field in DCI format 3A | $\delta_{PUCCH}$ [dB] |
|---|---|
| 0 | −1 |
| 1 | 1 |

Figure 6:
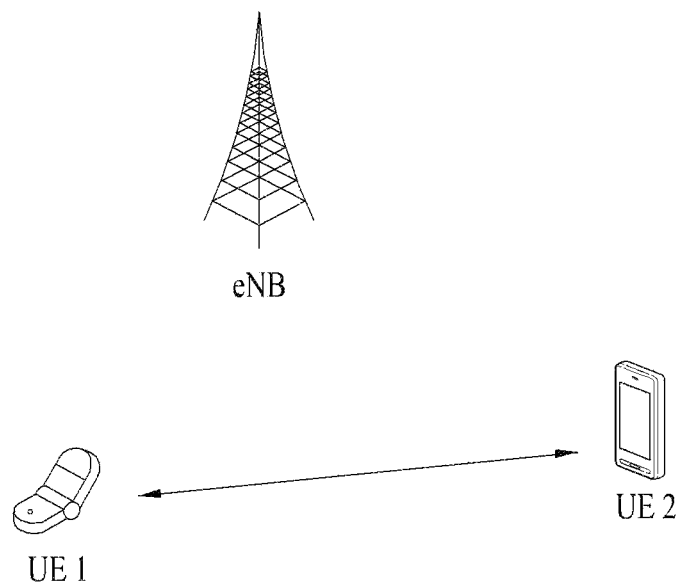
FIG. 6 is a conceptual diagram illustrating D2D direct communication.

FIG. 6 is a conceptual diagram illustrating D2D direct communication.

Referring to FIG. 6, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message.

In the present invention, as shown in FIG. 6, a method of detecting a counterpart UE when a UE performs D2D communication with another UE using a radio channel is proposed. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

As shown in FIG. 6, the UE should check whether the counterpart UE exists in a D2D communication area, in order to perform D2D communication. A process of determining whether a counterpart UE exists is referred to as device discovery or device detection. Such UE discovery is performed by transmitting a specific signal by one UE and detecting the signal by another UE and a signal transmitted and detected by a UE for discovery is referred to as a discovery signal.

In order to ensure coverage of D2D communication, it is important to appropriately maintain coverage of a discovery signal. Transmission of a discovery signal consumes a battery of a UE and a discovery signal transmitted with excessive power may cause interference with a neighboring cell or another D2D link. Accordingly, transmission of a discovery signal with excessive power is not preferable and transmit power of a discovery signal is preferably controlled to an appropriate level.

In control of transmit power of a discovery signal for D2D communication, unlike normal UE transmit power control, an eNB does not receive the discovery signal. A signal transmitted by a UE via an existing NU link is received by an eNB and the eNB may control UE transmit power based on quality of a received signal thereof. However, since the discovery signal is received by general UEs, it is difficult for the eNB to measure quality of the received signal. In addition, since the discovery signal is potentially received by a plurality of UEs, it is difficult to control transmit power based on reception quality of a specific UE. A UE in idle mode, which is not directly connected to the eNB, needs to transmit and receive a discovery signal as necessary. In addition, since some D2D links may operate outside coverage of the eNB, direct control of the eNB may be impossible.

Accordingly, in the present invention, a method of efficiently controlling transmit power of a discovery signal will be described.

<First Embodiment>—Transmit Power Control Based Path Loss from eNB

In a first embodiment of the present invention, a UE measures path loss from an eNB and determines transmit power of a discovery signal based on the path loss. This will be described in detail with reference to the drawings.

Figure 7:
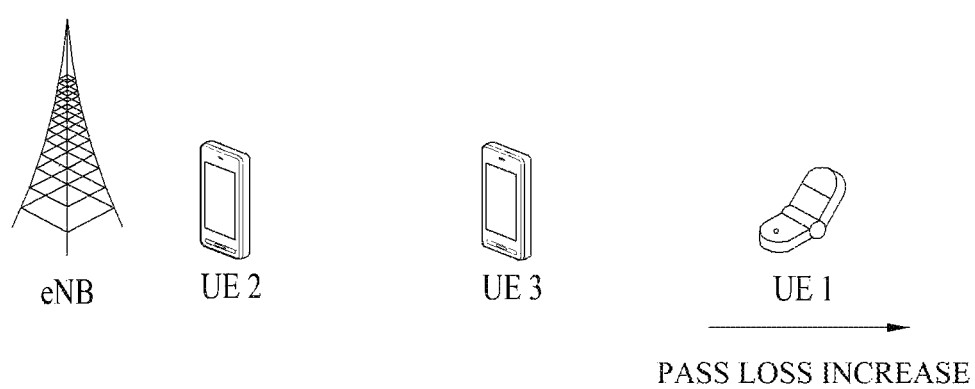
FIG. 7 is a diagram showing the concept of a situation to which the present invention is applied.

FIG. 7 is a diagram showing the concept of a situation to which the present invention is applied.

If it is assumed that UEs belonging to one eNB cell may receive a mutual discovery signal, as shown in FIG. 7, a UE located far apart from the eNB has a high probability that the UE is located far apart from another UE located in the same cell and thus preferably uses higher power. Therefore, the transmit power preferably increases according to path loss. That is, when UE1 transmits a discovery signal to UE2, the discovery signal is transmitted with relatively high power.

However, a UE located very close to the eNB is far apart from a UE located at a cell boundary and the UE located at the cell boundary may be easily influenced by interference with a neighboring cell. In order to solve this problem, receive power having a predetermined level or more is necessary. This means that, although path loss is reduced, transmit power is preferably maintained or increased. That is, even when UE2 transmits a discovery signal to UE1, the discovery signal is transmitted with relatively high power.

In contrast, when UE3, which is located between UE1 and UE2, transmits a discovery signal to UE1 located near the eNB and UE3 located at the cell boundary, the discovery signal may reach the UEs with relatively low power.

Figure 8:
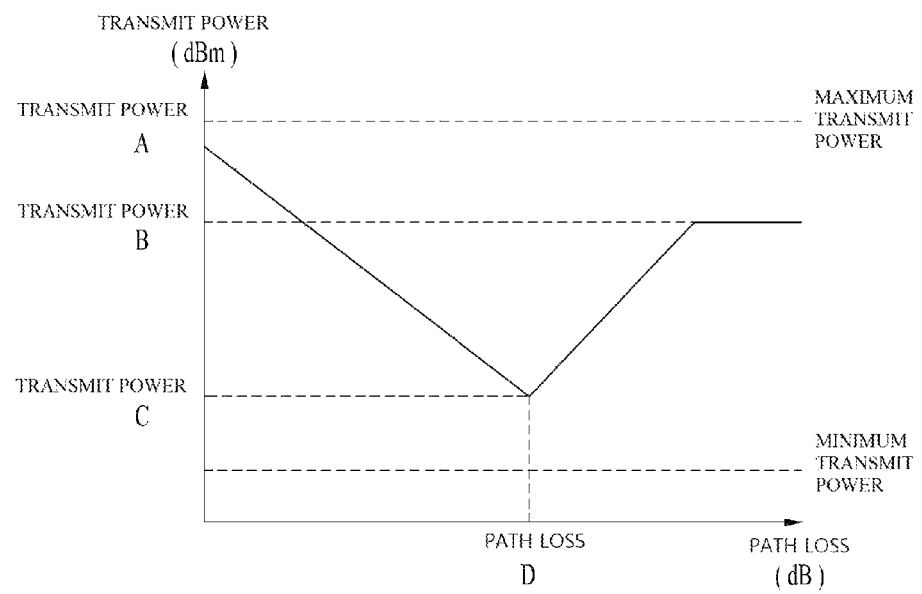
FIG. 8 is a diagram showing an example of controlling transmit power of a discovery signal according to a first embodiment of the present invention.

FIG. 8 is a diagram showing an example of controlling transmit power of a discovery signal according to a first embodiment of the present invention.

Referring to FIG. 8, it can be seen that, from a location closest to the eNB, that is, a point where path loss is 0, to a point where path loss is D, transmit power decreases from A to C. In addition, from path loss D, the transmit power increases to predetermined transmit power, that is, transmit power B in FIG. 8.

In this case, the eNB may signal a value corresponding to transmit power A, B and c and path loss D.

Figure 9:
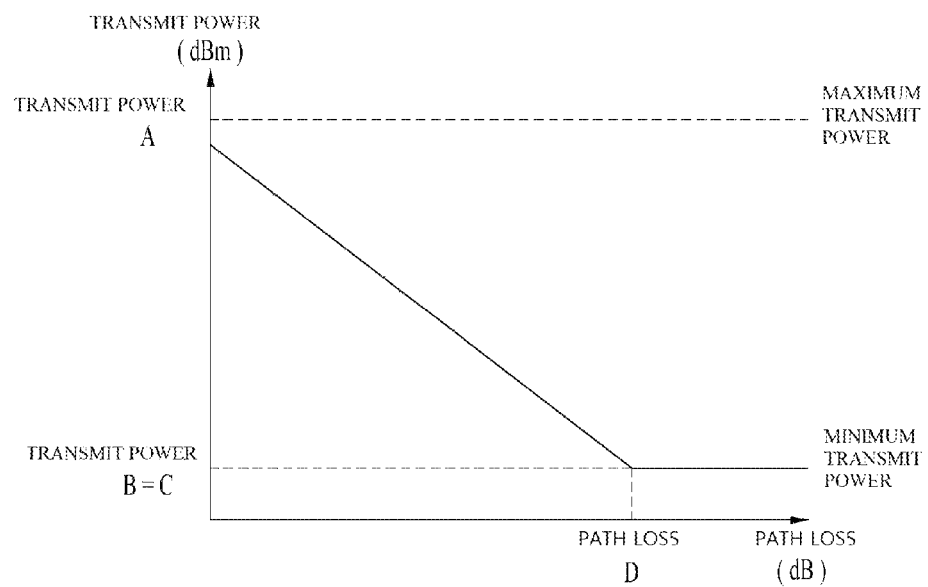
FIG. 9 is a diagram showing another example of controlling transmit power of a discovery signal according to a first embodiment of the present invention.

FIG. 9 is a diagram showing another example of controlling transmit power of a discovery signal according to a first embodiment of the present invention. In particular, FIG. 9 shows a special case of FIG. 8, wherein transmit power B and c are set to minimum transmit power or less of the UE. Of course, transmit power B and c need not be restricted to the minimum transmit power of the UE and may have a value greater than the minimum transmit power.

Referring to FIG. 9, it can be seen that transmit power of a discovery signal decreases as path loss increases. The method of controlling the transmit power of FIG. 9 may be used to reduce interference with a neighboring cell. This is because large path loss with one eNB in an environment in which cells of several eNBs coexist means that a UE is close to another eNB. Of course, path loss D may not be defined in some cases.

Figure 10:
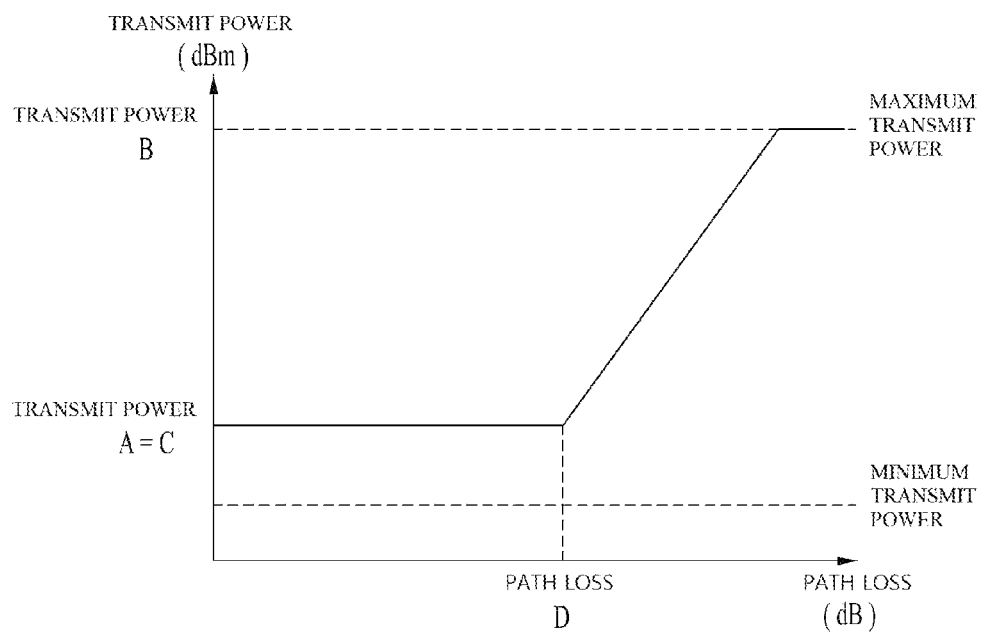
FIG. 10 is a diagram showing another example of controlling transmit power of a discovery signal according to a first embodiment of the present invention.

FIG. 10 is a diagram showing another example of controlling transmit power of a discovery signal according to a first embodiment of the present invention. In particular, FIG. 10 shows the case in which the transmit power A and C are set to the same value.

Referring to FIG. 10, a UE located at a position having path loss less than path loss D, that is, a UE located in a cell, uses uniform transmit power. However, when the UE moves to a cell boundary such that path loss thereof becomes greater than path loss D, higher transmit power is used such that a discovery signal reaches a relatively distant UE located in the cell with constant receive power. In FIG. 10, although it is assumed that transmit power B is set to be higher than maximum transmit power of the UE, transmit power B may not be defined if not necessary.

This method may cause high interference with a neighboring cell but may be used as a method of ensuring coverage of a discovery signal if an appropriate interference mitigation or interference cancellation (e.g., time/frequency resources used to transmit the discovery signal are not used by a neighboring cell) method is applied.

In addition, transmit power A and C is set to the same value such that the same power is used within a predetermined path loss range and transmit power is not changed according to change in path loss in this range. Accordingly, since received signal strength of the discovery signal means path loss with the UE, the reception UE can easily determine path loss with each UE.

Additionally, in a state of transmitting and receiving a discovery signal, the eNB may receive a PUSCH and a PUCCH. In this case, by decreasing transmit power of the discovery signal as path loss decreases, influence on reception of the PUSCH and PUCCH by the eNB needs to be reduced. Since transmission with extremely low power needs to be avoided, transmit power A and C are preferably set to an appropriate value greater than or equal to minimum power of the UE.

As described above, fundamentally, path loss may be path loss from a serving cell or a serving eNB. A UE which does not access a network yet, that is, a UE in an idle mode, may use path loss from an eNB, which has received a strongest signal, or an eNB having lowest path loss. Alternatively, a predetermined value may be calculated or derived from path loss from a plurality of eNBs. For example, after path loss from a plurality of eNBs, which is signaled from the eNBs, is calculated, one piece of representative path loss may be selected and transmit power may be set based on the representative path loss.

In particular, in this method, if the plurality of eNBs forms one D2D cluster and D2D communication is performed even when UEs belonging to the same cluster are connected to different eNB, the D2D cluster is regarded as one cell.

When path loss from each of the plurality of eNBs is $PL_n$, a detailed example of an equation for determining representative path loss is as follows.

i) maximum value: $PL = \max_{n}\{PL_n\}$ ii) minimum value: $PL = \min_{n}\{PL_n\}$ iii) arithmetic mean: $PL = \sum_{n=1}^{N} PL_n / N$ iv) geometric mean: $PL = \sqrt[N]{PL_1 * PL_2 * \ldots * PL_N}$ v) harmonic mean: $PL = \dfrac{N}{\sum_{n=1}^{N} 1/PL_n}$ vi) sum: $PL = \sum_{n=1}^{N} PL_n$ <Second Embodiment>—Power Control Based on Received Downlink Signal In a second embodiment of the present invention, a UE receives a downlink signal and determines power of a discovery signal based on the strength of the received signal. The strength of the received downlink signal may be the reception strength of a CRS or CSI-RS transmitted by the eNB or the reception strength of a signal observed on downlink, e.g., a received signal strength indicator (RSSI), including all signals such as noise or interference other than a specific signal.

In the second embodiment of the present invention, since a strong received downlink signal means low path loss, transmit power control of the discovery signal may be performed using a principle similar to the first embodiment. However, the second embodiment is different from the first embodiment in that information on transmit power of the eNB necessary to calculate path loss is not necessary. In particular, this method is more suitable when the UE does not receive the signal of the eNB, that is, when the UE is in an idle mode, or when the UE is located outside coverage of the eNB.

Figure 11:
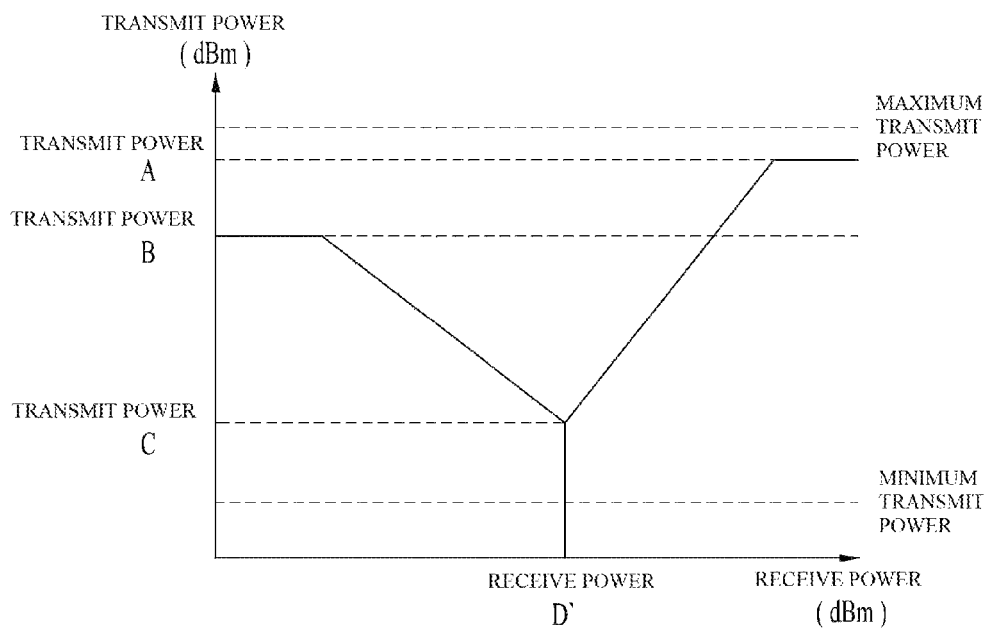
FIG. 11 is a diagram showing an example of controlling transmit power of a discovery signal according to a second embodiment of the present invention.

FIG. 11 is a diagram showing an example of controlling transmit power of a discovery signal according to a second embodiment of the present invention. In particular, FIG. 11 shows the case of applying the principle of FIG. 8. Since path loss is inversely proportional to the strength of receive power, FIG. 11 is bilaterally symmetrical to FIG. 8.

Figure 12:
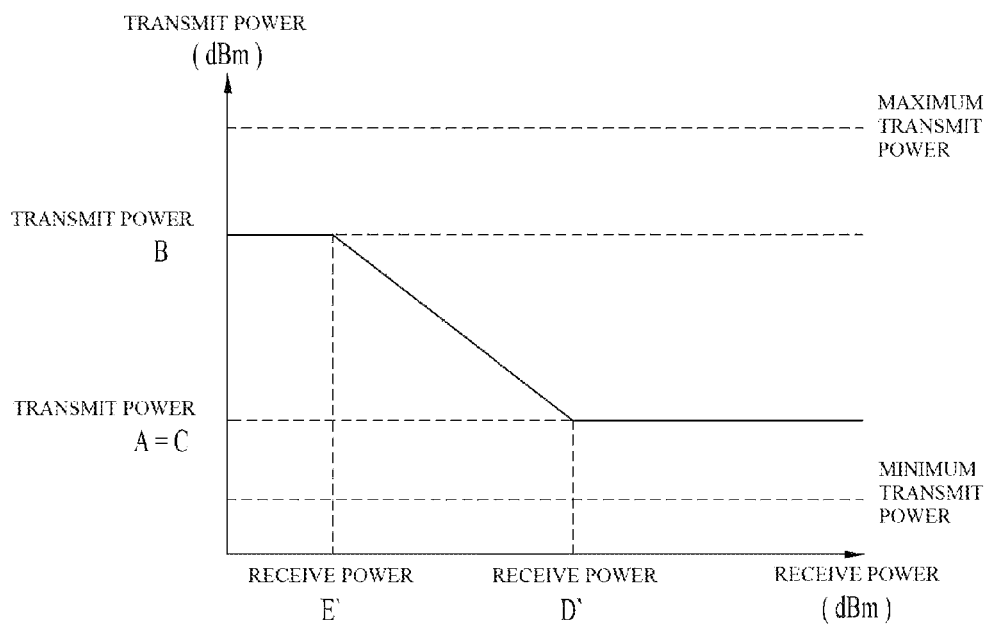
FIG. 12 is a diagram showing another example of controlling transmit power of a discovery signal according to a second embodiment of the present invention.

FIG. 12 is a diagram showing another example of controlling transmit power of a discovery signal according to a second embodiment of the present invention. In particular, FIG. 12 shows a power control method corresponding to FIG. 10.

Referring to FIG. 12, it can be seen that, when the strength of a received downlink signal is low, it is determined that an eNB does not exist near a UE and a discovery signal is transmitted with high transmit power. In particular, such operation is suitable when a UE independently performs D2D communication outside eNB coverage. As the UE, which has independently performed D2D communication, approaches the eNB, downlink receive power increases. Therefore, the transmit power of the discovery signal decreases to mitigate an interference problem due to transmission of the discovery signal unexpected by the eNB.

From this viewpoint, received power E' may be regarded as a criterion for determining whether a UE is close to coverage of an eNB. That is, when received power is less than E', it is determined that the UE is not close to eNB coverage and the value of transmit power B which is maximum power is used for D2D communication without considering interference with the eNB.

Figure 13:
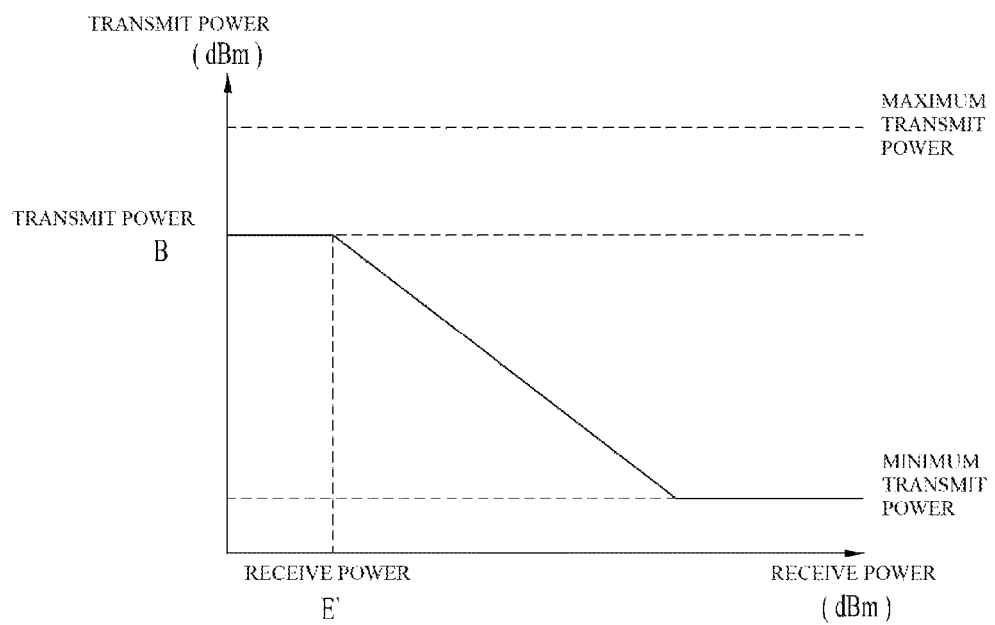
FIG. 13 is a diagram showing another example of controlling transmit power of a discovery signal according to a second embodiment of the present invention.

FIG. 13 is a diagram showing another example of controlling transmit power of a discovery signal according to a second embodiment of the present invention.

FIG. 13 shows modification of the transmit power control method of FIG. 12 and shows the case in which a received power value D' is not defined as a specific value. Similarly, transmit power A or C may not be defined as a specific value.

Upon operation according to the second embodiment of the present invention, when the UE accesses the eNB, transmit power may be set according to the instruction of the eNB. For example, when the UE enters eNB coverage while performing operation as shown in FIG. 13, transmit power instructed by the eNB may be used.

More specifically, if transmit power instructed by the eNB is transmit power A (=C) of FIG. 12, in FIG. 12, transmit power decreasing according to received power is used outside coverage having received signal power less than received power D' and transmit power instructed by the eNB is used in coverage having received signal power greater than received power D'.

<Third Embodiment>—Power Control Based on Resource for D2D Communication

In addition to the first and second embodiments, in a third embodiment of the present invention, a UE may receive a signal via a resource for D2D communication and control transmit power of a discovery signal based on the power level of the received signal. The resource for D2D communication may mean an uplink resource used to perform transmission operation at the UE, e.g., an uplink frequency band in FDD and an uplink subframe in TDD. Here, a received uplink signal may include all signals received via an uplink resource, including noise or interference.

In general, the UE receiving an uplink signal with high power means that a UE for performing uplink transmission exists. At this time, if the uplink signal of this UE is regarded as a signal transmitted from the UE to the eNB, this means that a cell exists near the UE. In order to reduce interference with the cell, operation shown in FIG. 12 or 13 needs to be performed. That is, when high received power is measured, it is determined that a cell exists near the UE and transmit power is reduced. In this case, since a D2D signal should be excluded from an uplink signal, received signal strength is measured only via a time/frequency resource which is not used for D2D communication and this measured signal is regarded as a signal exchanged between the UE and the eNB.

<Fourth Embodiment>—Power Control Based on Measurement/Report of UE and Instruction of eNB In a fourth embodiment of the present invention, an eNB transmits a message for instructing transmit power control of a discovery signal to a UE and the UE controls the transmit power of the discovery signal. Within the cell of one eNB, since a probability that a large number of UEs transmits discovery signals is high, the message for instructing transmit power control is commonly applicable to the plurality of UEs.

The eNB checks reception quality of the discovery signal in order to control the transmit power of the discovery signal. Since a receiver for receiving the discovery signal is an individual UE, each UE should measure reception quality and report reception quality to the eNB. When the individual UE measures and reports the quality of the discovery signal, since much signaling overhead is caused, an appropriate processing procedure is necessary in the measurement/reporting procedure.

For example, the UE may measure quality of some discovery signals or some discovery signal resources without measuring quality of all discovery signals. More specifically, if a resource used to transmit one discovery signal is defined as one discovery resource, the UE measures signal quality with respect to m resources among M resources present in a measurement interval. When M resources are distributed and transmitted in T time regions, measurement in each time region is uniformly distributed and measurement is performed with respect to m/T resources in one time region. Even when resources in the plurality of measurement intervals are transmitted in several frequency regions, measurement may be uniformly performed in each frequency region. Here, signal quality may be reference signal received power (RSRP) or reference signal received quality (RSRQ) of an individual discovery signal. However, since it may be difficult to attempt to individually detect the signal of each UE, signal quality may be RSSI in an individual discovery signal resource.

When the UE reports the measured quality, the statistical value of the measured values may be reported, thereby maintaining less signaling overhead as compared to the case of reporting an individual measured value. As the statistical value, an average value of measured values or a value corresponding to a median value or the lower 5% of measured values aligned in order may be used.

In transmit power control of the discovery signal, a combination of two or more of the above-described embodiments may be used. For example, a lowest value among transmit powers derived by a predetermined embodiment among the above-described embodiments may be used. That is, in each embodiment, a method of determining an actual transmit power value or a method of determining a maximum discovery signal transmit power value may be used. For example, the UE may use appropriate power less than or equal to transmit power determined by one combination or a plurality of combinations of the above-described embodiments in consideration of the situation thereof. That is, when battery power is low, the UE may use less power than the determined power to reduce battery consumption.

In addition, when the transmit power of the discovery signal is determined according to the above-described method, transmit power of a D2D communication signal may be determined based on the transmit power of the discovery signal. For example, transmit power of the D2D communication signal may be determined by adding a predetermined offset value to the transmit power of the discovery signal. This offset value may be predetermined or may be determined according to the amount of information transmitted and received via D2D communication, a modulation scheme used for D2D communication, the size of a frequency region, etc.

According to the second and third embodiments, the UE may check whether a cell is located near the UE using the reception strength of a downlink signal and/or the reception strength of a signal in a D2D resource. In this case, when a D2D UE located outside the cell coverage of the eNB confirms that the cell of another eNB exists, transmit power may be reduced to protect the UE for performing communication in the cell from strong interference. However, in some resources, D2D communication may not be performed to protect the UE in the cell.

For example, as shown in FIG. 12, the D2D UE located outside coverage confirms that a neighboring cell exists if the reception strength of a downlink signal is greater than received power E' and does not transmit a D2D signal in some time/frequency regions. In particular, once the D2D signal is transmitted, the D2D signal may not be transmitted during at least a predetermined time. In contrast, when the received signal strength is less than E', all resources are used for the D2D signal.

Figure 14:
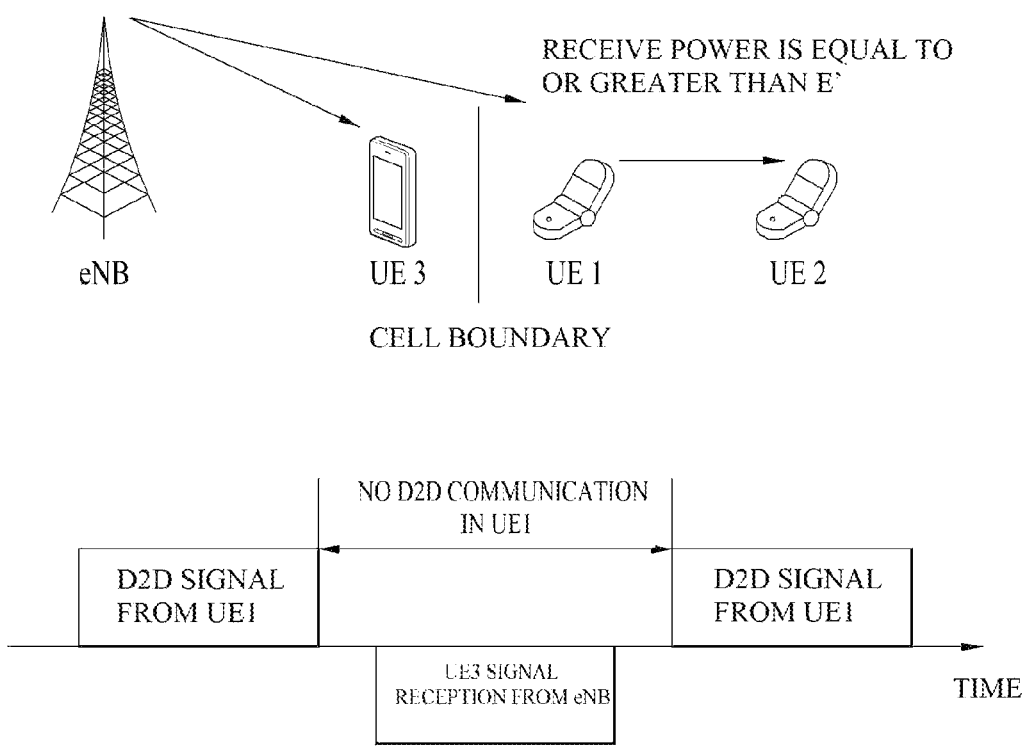
FIG. 14 is a diagram showing an example of setting a prohibition zone of D2D communication according to receive power.

FIG. 14 is a diagram showing an example of setting a prohibition zone of D2D communication according to received power.

Referring to FIG. 14, it can be seen that, in an interval in which UE3 receives the signal of the eNB, UE1 may not transmit the D2D signal. In particular, operation of FIG. 14 is efficient in a TDD system in which resources used when the UE receives the signal of the eNB and resources used when the UE transmits the D2D signal coexist in the same frequency band.

Figure 15:
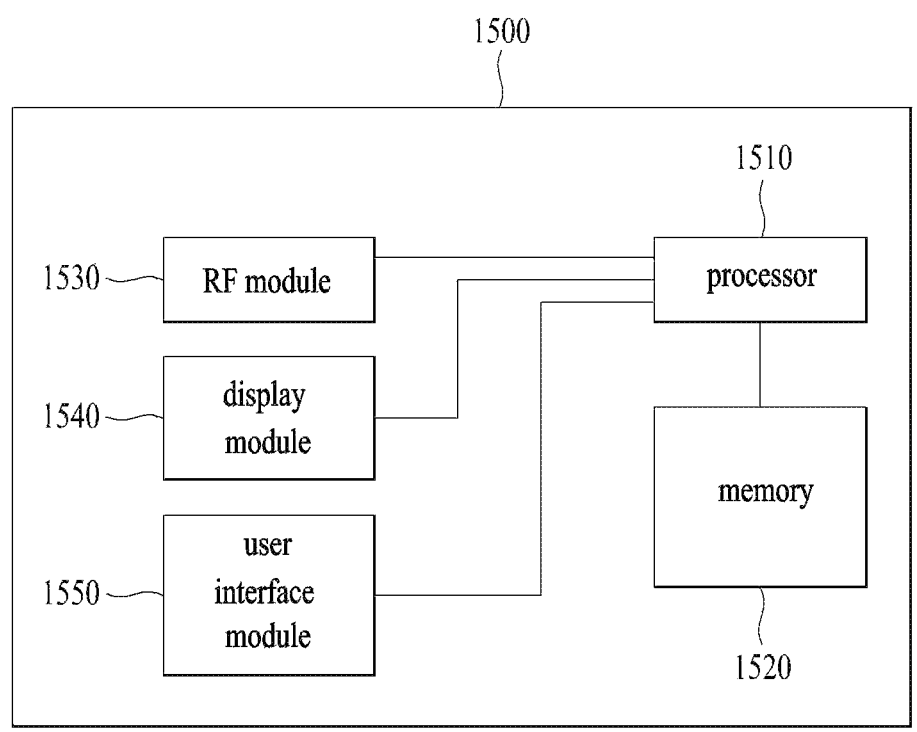
FIG. 15 is a block diagram illustrating a communication device according to embodiments of the present invention.

FIG. 15 is a block diagram illustrating a communication device according to embodiments of the present invention.

In FIG. 15, the communication device 1500 includes a processor 1510, a memory 1520, a Radio Frequency (RF) module 1530, a display module 1540, and a user interface (UI) module 1550.

The communication device 1500 is disclosed for illustrative purposes only and certain modules may also be omitted from the communication device 1500 as necessary. In addition, the communication device 1500 may further include necessary modules. Some modules of the communication device 1500 may be identified as more detailed modules. The processor 1510 is configured to carry out the operations of the embodiments of the present invention. For detailed operations of the processor 1510 reference may be made to FIGS. 1 to 14.

The memory 1520 is connected to the processor 1510, and stores an operating system, applications, program code, data and the like. The RF module 1530 is connected to the processor 1510 and converts a baseband signal into a radio frequency (RF) signal, or converts the RF signal into the baseband signal. For these operations, the RF module 1530 performs analog conversion, amplification, filtering, and frequency up-conversion in order or performs such operations in reverse order. The display module 1540 is connected to the processor 1510 and displays a variety of information. The scope or spirit of the display module 1540 of the present invention is not limited thereto, and the display module 1540 may be any of well-known elements, for example, a Liquid Crystal Display (LCD), a Light Emitting Diode (LED), an Organic Light Emitting Diode (OLED) and the like. The user interface (UI) module 1450 is connected to the processor 1510, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although an example in which a method and apparatus for controlling transmit power of a discovery signal for D2D communication in a wireless communication system is applied to a 3GPP LTE system is described, the present invention is applicable to various wireless communication systems in addition to the 3GPP LTE system.

The invention claimed is:

1. A method of transmitting a device-to-device (D2D) link signal at a user equipment (UE) in a wireless communication system, the method comprising:
   determining a reference downlink pathloss from a D2D cluster including a plurality of base stations;
   calculating a transmission power for the D2D link signal according to the reference downlink pathloss; and
   transmitting the D2D link signal to at least one target UE according to the calculated transmission power for the D2D link signal,
   wherein the reference downlink pathloss is determined as an average value of downlink pathlosses from the plurality of base stations,
   wherein the transmission power for the D2D link signal decreases as the reference downlink pathloss increases, if the reference downlink pathloss is less than a first value,
   wherein the transmission power for the D2D link signal increases as the reference downlink pathloss increases, if the reference downlink pathloss is greater than the first value.

2. The method according to claim 1, wherein, when the reference downlink pathloss is greater than a second value, the D2D link signal is transmitted according to a maximum transmission power for the D2D link signal regardless of the calculated transmission power for the D2D link signal.

3. The method according to claim 1, wherein the D2D link signal comprises a discovery signal for the D2D link.

4. A user equipment (UE) for performing device-to-device (D2D) link communication in a wireless communication system, the UE apparatus comprising:
- a wireless communication unit; and
- a processor, connected with the wireless communication unit, that:
  - determines a reference downlink pathloss from a D2D cluster including a plurality of base stations, calculates transmission power for a D2D link signal according to the reference downlink pathloss, and controls the wireless communication module to transmit the D2D link signal to at least one target UE according to the calculated transmission power for the D2D link signal, and
  - wherein the processor determines the reference downlink pathloss as an average value of downlink pathlosses from the plurality of base stations,
  - wherein the processor decreases the transmission power for the D2D link signal as the reference downlink pathloss increases, if the reference downlink pathloss is less than a first value,
  - wherein the processor increases the transmission power for the D2D link signal as the reference downlink pathloss increases, if the reference downlink pathloss is greater than the first value.

5. The UE according to claim 4, wherein when the reference downlink pathloss is greater than a second value, the processor controls the wireless communication module to transmit the D2D link signal according to a maximum transmission power for the D2D link signal regardless of the calculated transmission power for the D2D link signal.

6. The UE according to claim 4, wherein the D2D link signal comprises a discovery signal for the D2D link.

* * * * *